(12) United States Patent
Bakken et al.

(10) Patent No.: US 8,287,207 B2
(45) Date of Patent: Oct. 16, 2012

(54) SELF-CENTERING SHAFT ADAPTER FOR ACTUATORS

(75) Inventors: Tom M. Bakken, Apple Valley, MN (US); David A. Burger, Minneapolis, MN (US); Bruce E. Tischer, St. Louis Park, MN (US); Dennis R. Grabowski, Champlin, MN (US)

(73) Assignee: Honeywell International Inc., Morristown, NJ (US)

( * ) Notice: Subject to any disclaimer, the term of this patent is extended or adjusted under 35 U.S.C. 154(b) by 768 days.

(21) Appl. No.: 11/843,389

(22) Filed: Aug. 22, 2007

(65) Prior Publication Data

US 2009/0052982 A1 Feb. 26, 2009

(51) Int. Cl.
*B25G 3/00* (2006.01)
*F16L 41/00* (2006.01)
*F16B 9/00* (2006.01)

(52) U.S. Cl. .................................. 403/261; 403/374.3

(58) Field of Classification Search .............. 403/1, 256, 403/261, 373, 374.1–374.4, 289, 290; 264/234, 264/287; 269/3, 6, 234, 287
See application file for complete search history.

(56) References Cited

U.S. PATENT DOCUMENTS

| | | | |
|---|---|---|---|
| 9,123 A | 7/1852 | Turner | |
| 14,795 A * | 5/1856 | Buss | 269/5 |
| 214,538 A * | 4/1879 | Westermaier | 269/5 |
| 1,414,354 A * | 5/1922 | Gibbs | 269/250 |
| 1,879,099 A * | 9/1932 | Coffey | 29/246 |
| 1,969,827 A | 8/1934 | Tautz | |
| 2,428,688 A | 10/1947 | Stischer | |
| 3,595,505 A | 7/1971 | Burwell | |
| 3,625,503 A * | 12/1971 | Hall | 269/234 |
| 3,776,275 A | 12/1973 | Updike | |
| 3,849,008 A | 11/1974 | Boucher et al. | |
| 3,880,534 A | 4/1975 | Schmidt | |
| 4,276,692 A * | 7/1981 | Casler et al. | 30/347 |
| 4,327,608 A * | 5/1982 | Keys | 81/4 |
| 4,354,399 A | 10/1982 | Katayama | |
| 4,433,218 A | 2/1984 | Provencher | |
| 4,490,081 A * | 12/1984 | Kuchuk-Yatsenko et al. | 409/300 |
| 4,527,440 A | 7/1985 | Heitman et al. | |
| 5,026,197 A | 6/1991 | Johnson et al. | |
| 5,118,078 A | 6/1992 | Younker | |
| 5,187,916 A * | 2/1993 | Errani et al. | 53/389.2 |
| 5,223,679 A | 6/1993 | Yoo | |
| 5,241,292 A | 8/1993 | Bjorknas et al. | |
| 5,509,752 A | 4/1996 | Kocisek | |
| 5,544,970 A | 8/1996 | Studer | |
| 5,638,927 A | 6/1997 | Cheatham et al. | |
| 5,651,631 A * | 7/1997 | Carmien | 403/261 |

(Continued)

*Primary Examiner* — Daniel P. Stodola
*Assistant Examiner* — Nahid Amiri
(74) *Attorney, Agent, or Firm* — Seager Tufte & Wickhem LLC.

(57) ABSTRACT

A self-centering shaft adapter may include a first jaw, a second jaw, and an actuation mechanism, wherein the first jaw and the second jaw define an opening for receiving a shaft therein. The actuation mechanism may be able to exert a force upon the first jaw and the second jaw creating a movement in the first jaw and the second jaw in opposite directions. The movement of the first jaw and the second jaw may increase or decrease the size of the opening. In some cases, the opening may maintain a relatively constant center regardless of the size of the opening. In some cases, the actuation mechanism may be a wedge. In other cases, the actuation mechanism may be a double-threaded screw.

6 Claims, 18 Drawing Sheets

U.S. PATENT DOCUMENTS

| | | |
|---|---|---|
| 5,765,466 A | 6/1998 | Plantan et al. |
| 5,896,959 A | 4/1999 | Jeffries et al. |
| 5,971,378 A * | 10/1999 | Sweeney .......................... 269/6 |
| 6,079,704 A * | 6/2000 | Buck ............................. 269/242 |
| 6,322,282 B1 | 11/2001 | Kussman et al. |
| 6,505,991 B2 | 1/2003 | Roman |
| 6,665,919 B1 * | 12/2003 | Kurtz et al. ..................... 29/262 |
| 6,837,646 B1 * | 1/2005 | Minger ....................... 403/374.4 |
| 6,935,615 B2 * | 8/2005 | McCarty ....................... 251/214 |
| 2003/0213662 A1 | 11/2003 | Fox |
| 2004/0222056 A1 | 11/2004 | Fox |
| 2006/0204322 A1 * | 9/2006 | Roiser ........................ 403/109.5 |

* cited by examiner

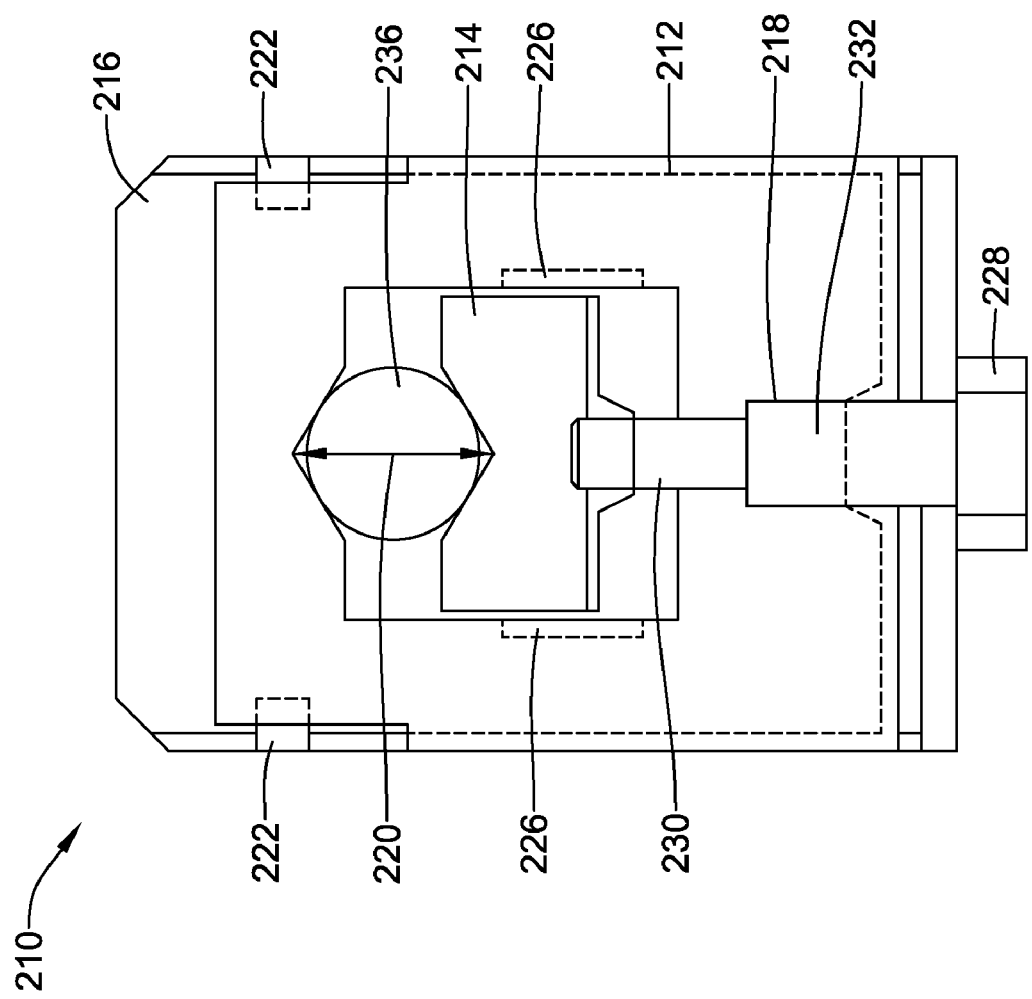

SELF-CENTERING SHAFT ADAPTER FOR ACTUATORS

FIELD

The present invention relates generally to actuator shaft adapters, and more particularly, to self-centering shaft adapters for actuators.

BACKGROUND

HVAC systems often include actuatable control devices such as dampers, valves, ventilation flaps, louvers, and/or other devices that, for example, help regulate the flow of air or gas. Many of these actuatable control devices have a rotary axle or shaft that, during use, is actuated by a drive unit such as an electric motor or the like. In a direct coupled actuator, a shaft adapter is configured to be placed over and coupled to the axle or shaft of the actuatable control device. Once installed, the drive unit may, through the shaft adapter, transmit a torque to the axle or shaft to actuate the actuatable control device.

In many applications, it is desirable to have the shaft adapter centered or coaxial with the axle or shaft of the actuatable control device when installed. However, the axles and/or shafts of many actuatable control devices come in a variety of sizes and/or shapes. Previously, it has been difficult and cumbersome to accommodate the various shaft sizes and/or shapes, particularly while maintaining the desired concentric arrangement between the shaft adapter and the axle or shaft of the actuatable control device. In some cases, a series of shaft adapters are produced, with each shaft adapter designed to accommodate a particular shaft size and/or shape. Alternatively, a series of separate inserts are provided, each designed to accommodate a particular shaft size and/or shape.

What would be desirable is an improved shaft adapter that can accommodate various sizes and/or shapes of axles or shafts of actuatable control devices, while providing a self centering arrangement between the shaft adapter and the axle or shaft of the actuatable control devices.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to actuator shaft adapters, and more particularly, to self-centering shaft adapters for actuatable control devices. In one illustrative embodiment, a self-centering shaft adapter includes a first jaw, a second jaw, and an actuation mechanism, wherein the first jaw and the second jaw define an opening to receive a shaft. The actuation mechanism may exert a force upon the first jaw and the second jaw creating a movement in the first jaw and the second jaw in opposite directions. The movement of the first jaw and the second jaw may increase or decrease the diameter of the opening, and the opening may maintain a relatively constant center regardless of the size of the opening. The actuation mechanism may include a wedge, a double-threaded screw and/or any other suitable actuation mechanism.

BRIEF DESCRIPTION

The invention may be more completely understood in consideration of the following detailed description of various illustrative embodiments of the invention in connection with the accompanying drawings, in which:

FIG. 18 is a top schematic view of the illustrative self-centering shaft adapter of FIG. 15 coupled to another illustrative shaft.

DETAILED DESCRIPTION

Figure 1:
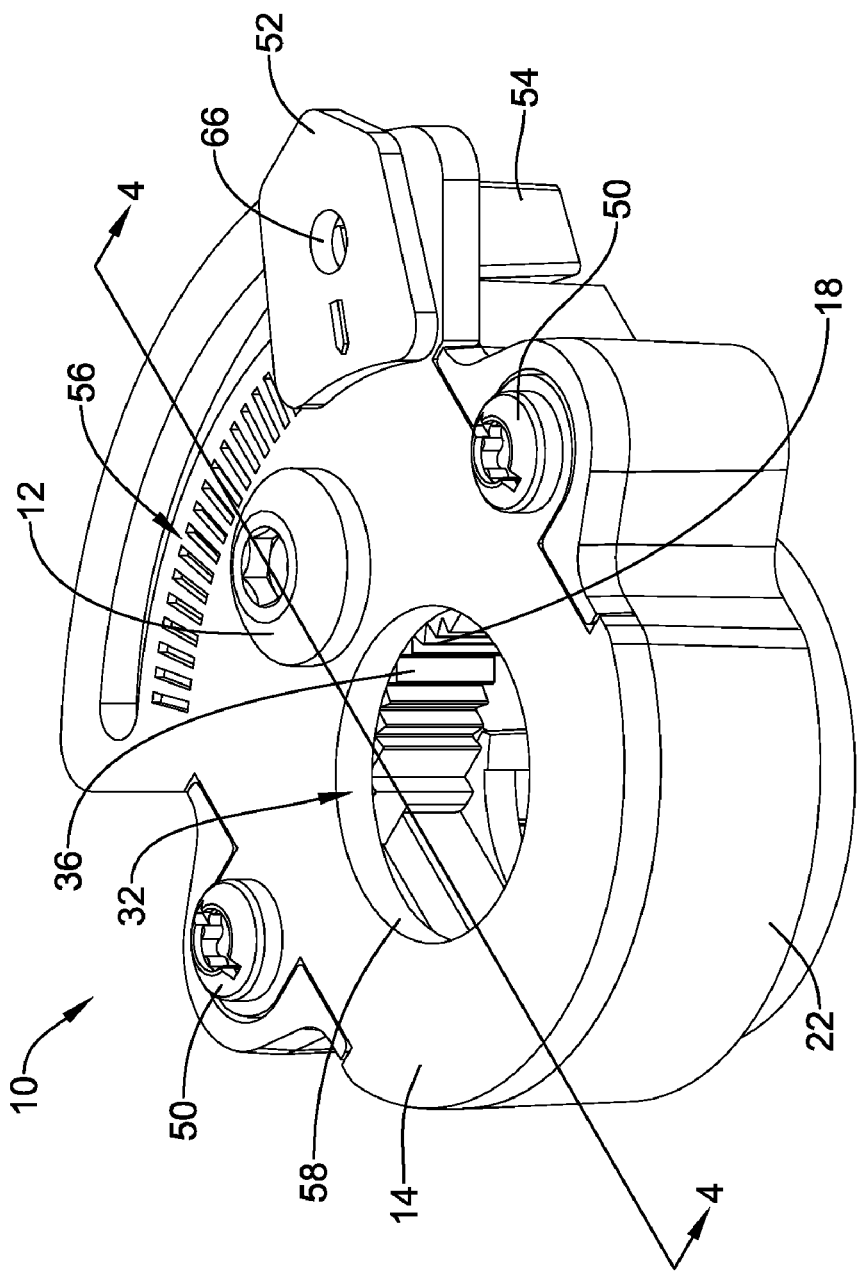
FIG. 1 is a perspective view of an illustrative embodiment of a self-centering shaft adapter in accordance with the present invention.

The following description should be read with reference to the drawings wherein like reference numerals indicate like elements throughout the several views. The detailed description and drawings show several embodiments, which are meant to be illustrative of the claimed invention. It should be appreciated that the terms "upper", "lower", "front", "back", "top", "bottom", "left", and "right" are used herein only as relative terms, and are not intended to be limiting in any way. That is, it should be recognized that depending on the orientation of the shaft adapter, the upper, lower, front, back, top, bottom, left, and right relative terms may change.

FIG. 1 is a perspective view of an illustrative self-centering shaft adapter 10 in accordance with one illustrative embodiment of the present invention. The illustrative self-centering shaft adapter 10 may be mounted in or relative to an actuator (not shown), such as, for example, a direct coupled actuator. As illustrated, the shaft adapter 10 may include an opening 32 configured to receive a shaft or axle of a actuatable control device, such as a damper, a valve, a ventilation flap, a louver, or any other suitable actuatable control device, as desired. The self-centering shaft adapter 10 may transfer a torque from a drive unit (not shown) such as an electric motor to the shaft to actuate the position of the actuatable control device. In some cases, the self-centering shaft adapter 10 may be configured to exert a torque of about 150 in-lbs, 100 in-lbs, 50 in-lbs or less on the shaft. However, it is contemplated that the self-centering shaft adapter 10 may be configured to exert any suitable torque on the shaft, depending on the application.

In the illustrative embodiment, the opening 32 of the self-centering shaft adapter 10 may be defined by a first jaw (shown as reference number 16 in FIGS. 2-5 and 7-8) and a second jaw 18. An actuation mechanism can be provided and configured to adjust the size of the opening 32 by moving the first jaw 16 and the second jaw 18. As such, the opening 32 may be adjustable to accommodate shafts of various shapes and/or sizes.

In some cases, the self-centering shaft adapter 10 may provide a concentric or coaxial alignment of the shaft with the opening 32. To accomplish this, in some cases, the first jaw 16 and the second jaw 18 may be configured to move in opposite directions, and about the same distance. As a result, the shaft may be positioned along the same axis relative to the shaft adapter 10 regardless of the size and/or shape of the shaft, and thus the shaft adapter 10 may be considered "self-centering".

Figure 2:
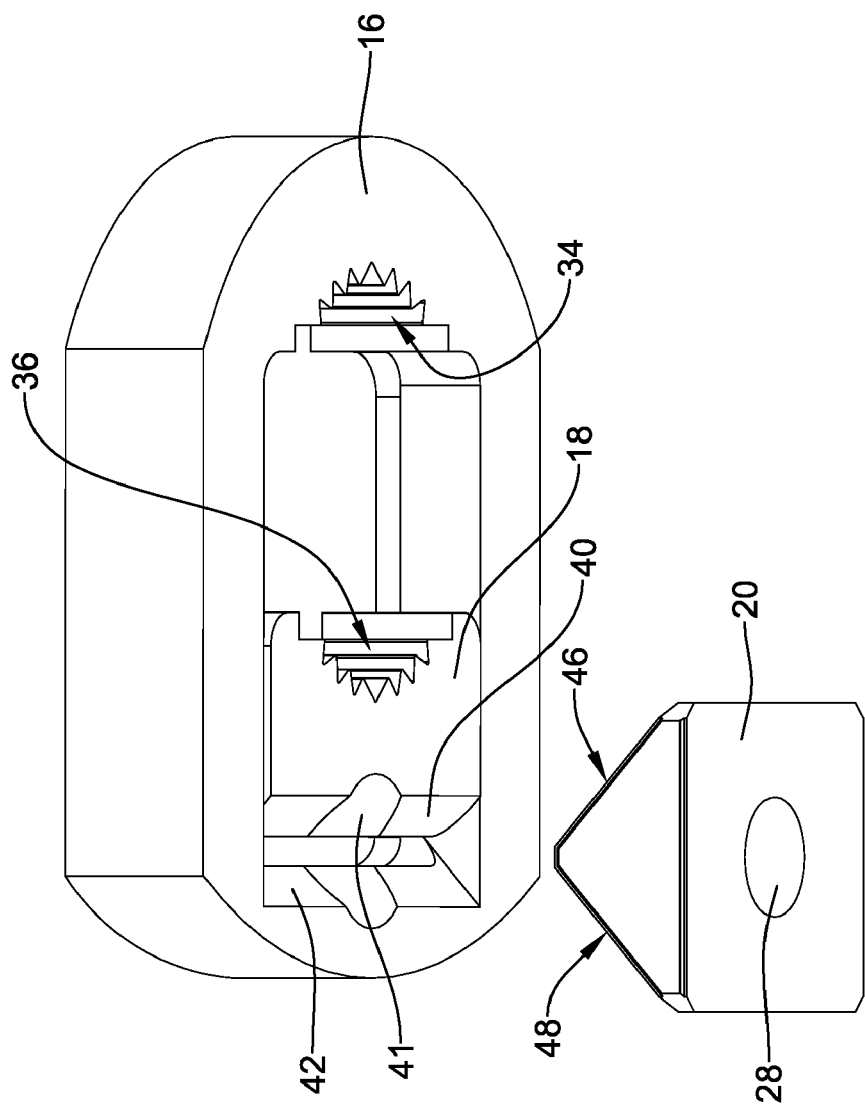
FIG. 2 is an exploded view of the outer jaw, the inner jaw, and the wedge of the illustrative self-centering shaft adapter of FIG. 1.

FIG. 2 is an exploded view of the first jaw 16, the second jaw 18, and the actuation mechanism of the illustrative self-centering shaft adapter 10 of FIG. 1. In the illustrative embodiment, the first jaw 16 may be considered an outer jaw, the second jaw 18 may be considered an inner jaw, and the actuation mechanism may include a wedge 20.

The illustrative inner jaw 18 includes a top surface, a bottom surface, and one or more side surfaces. One of the side surfaces of inner jaw 18 may include a face portion 36 configured to contact a shaft. In some cases, face portion 36 may include a curved portion, but this is not required. In some cases, curved portion of the face 36 may be semi-circular in shape. However, it is contemplated that any suitable shape may be used, depending on the application, as desired.

Face 36 may include a surface configured to reduce slippage between the shaft and face. In some cases, face 36 may include one or more protrusions, grooves, splines, or teeth, which may engage, in part, a portion of the shaft. Alternatively, or in addition, face 36 may be a high friction surface or include a coating to help reduce slippage between face 36 and the shaft. However, it is contemplated that any suitable surface for face 36 may be used, as desired.

In some cases, inner jaw 18 may include an angled or inclined surface 40 for contacting the actuation mechanism 20 on the one or more side surface. In the illustrative embodiment, the angle or inclined surface 40 may be on a side surface opposite of the side surface that includes face 36. In some cases, the angled or inclined surface 40 may have an angle or incline of about 30 degrees, 45 degrees, 60 degree, or any other suitable angle or incline, as desired. In some cases, the angled surface 40 may be configured to match an angled or inclined surface 46 of the actuation mechanism 20, if desired.

In some cases, the side surface including angled or inclined surface 40 may include a recess 41 configured to surround at least a portion of a screw 12 (see FIGS. 1, and 3-8), but this is not required. In some cases, this recess 41 may be a semi-circular recess or cutout portion to allow screw 12 to pass through.

In the illustrative embodiment, inner jaw 18 may be configured to fit within at least a portion of outer jaw 16. In some cases, inner jaw 18 may include a lip 43 on one or more of the one or more side surfaces (see FIG. 3). In some cases, outer jaw 16 may include a lip 45 corresponding to the lip 43 on the inner jaw 18 (see FIG. 3). In some cases, inner jaw 18 may be configured to translate relative to the outer jaw 16 along the lip.

In the illustrative embodiment, outer jaw 16 may include a top surface, a bottom surface, one or more outer side surfaces, and one or more inner side surfaces. As discussed previously, in some cases, one or more of the inner side surfaces may include a lip 45 configured to mate with the lip 43 on the one or more side surfaces of the inner jaw 18 (see FIG. 3). In the illustrative embodiment, one or more inner side surface of outer jaw 16 may include a face portion 34 configured to contact a shaft. In some cases, face portion 34 may include a curved portion, but this is not required. In some cases, curved portion of the face 34 may be semi-circular in shape, but it is contemplated that any suitable shape may be used depending on the application, as desired.

Face 34 may include a surface configured to reduce slippage between the shaft and face. In some cases, face 34 may include one or more protrusions, grooves, splines, or teeth, which may engage, in part, a portion of the shaft. Alternatively, or in addition, face 34 may be a high friction surface or include a coating to help reduce slippage between face 34 and the shaft. However, it is contemplated that any suitable surface of face 34 may be used, as desired.

In some cases, outer jaw 16 may include an angled or inclined surface 42 for contacting the actuation mechanism 20. In the illustrative embodiment, the angle or inclined surface 42 may be on an inner side surface opposite of the inner side surface including face 34. In some cases, the angled or inclined surface 42 may have an angle or incline of about 30 degrees, 45 degrees, 60 degree, or any other suitable angle or incline, as desired. In some cases, the angled surface 42 may be configured to match an angled or inclined surface 48 of the actuation mechanism 20, if desired.

In some cases, the inner side surface including angled or inclined surface 42 may include a recess configured to surround at least a portion of a screw 12 (see FIGS. 1, and 3-8), but this is not required. In some cases, this recess may be a semi-circular recess or cutout portion to allow screw to pass through.

In the illustrative embodiment, self-centering shaft adapter 10 may include an actuation mechanism 20 to engage the inner jaw 18 and/or the outer jaw 16 creating a movement of face 34 of the outer jaw 16 relative to face 36 of inner jaw 18. In the illustrative embodiment, the actuation mechanism 20 may be a wedge as shown. In some cases, wedge 20 may be a double-sided wedge with a threaded hole 28 in the center. The double-sided wedge may include a first angled or inclined surface 46 and a second angled or inclined surface 48. In some cases, angled surface 48 may be configured and positioned to contact angled surface 42 of the outer jaw 16, and angled or inclined surface 46 may have an angle or incline similar to angled or inclined surface 40 of inner jaw 18, as shown. In some cases, angled surface 48 of wedge 20 may have an angle or incline similar to angled or inclined surface 42 of outer jaw 16, and angled or inclined surface 46 of wedge 20 may have an angle or incline similar to angled or inclined surface 40 of inner jaw 18, but this is not required in all embodiments. In some cases, angled surfaces 46 and 48 may both have the same angle or incline, or, in other cases, angled surface 46 and 48 may have different angles or inclines, as desired.

In the illustrative embodiment, the wedge 20 may include a threaded screw hole 28 through it. In some cases, threaded screw hole 28 may be configured to receive a screw 12. In some cases, screw 12 may fix the wedge 20 relative to the screw 12, and may be centered relative to the wedge 20, but this is not required.

In the illustrative embodiment, wedge 20 may be configured to move between inner jaw 18 and outer jaw 16, contacting angled surfaces 40 and 42. In some cases, wedge 20 may be moved in a relative inward and outward direction towards the inner jaw 18 and the outer jaw 16 by turning screw 12 in an appropriate direction. As the wedge 20 moves inwards toward the inner and outer jaws, wedge 20 may contact at least a portion of the inner jaw 18 and the outer jaw 16. In some cases, as the wedge 20 moves further inwards, a force may be exerted between the wedge 20 and the inner jaw 18 and the outer jaw 16. As the force is increased, the inner jaw 18 and the outer jaw 16 may be moved in directions laterally away from one another. In some cases, the inner jaw 18 and outer jaw 16 may move in a direction generally perpendicular to the inward movement of wedge 20.

In some cases, the force exerted upon the inner jaw 18 and the outer jaw 16 may be along an axis parallel to the cross-section line 4-4 of FIG. 1. In some cases, the force may be exerted upon the inner jaw 18 and the outer jaw 16 in opposite directions along the same axis. The inner jaw 18 and the outer jaw 16 may move a similar distance, but in opposite directions along the axis. As the inner jaw 18 and the outer jaw 16 are moved, faces 34 and 36 may move closer together, decreasing the diameter of the opening 32 to accommodate various size and shape shafts that may be inserted therein.

Figure 3:
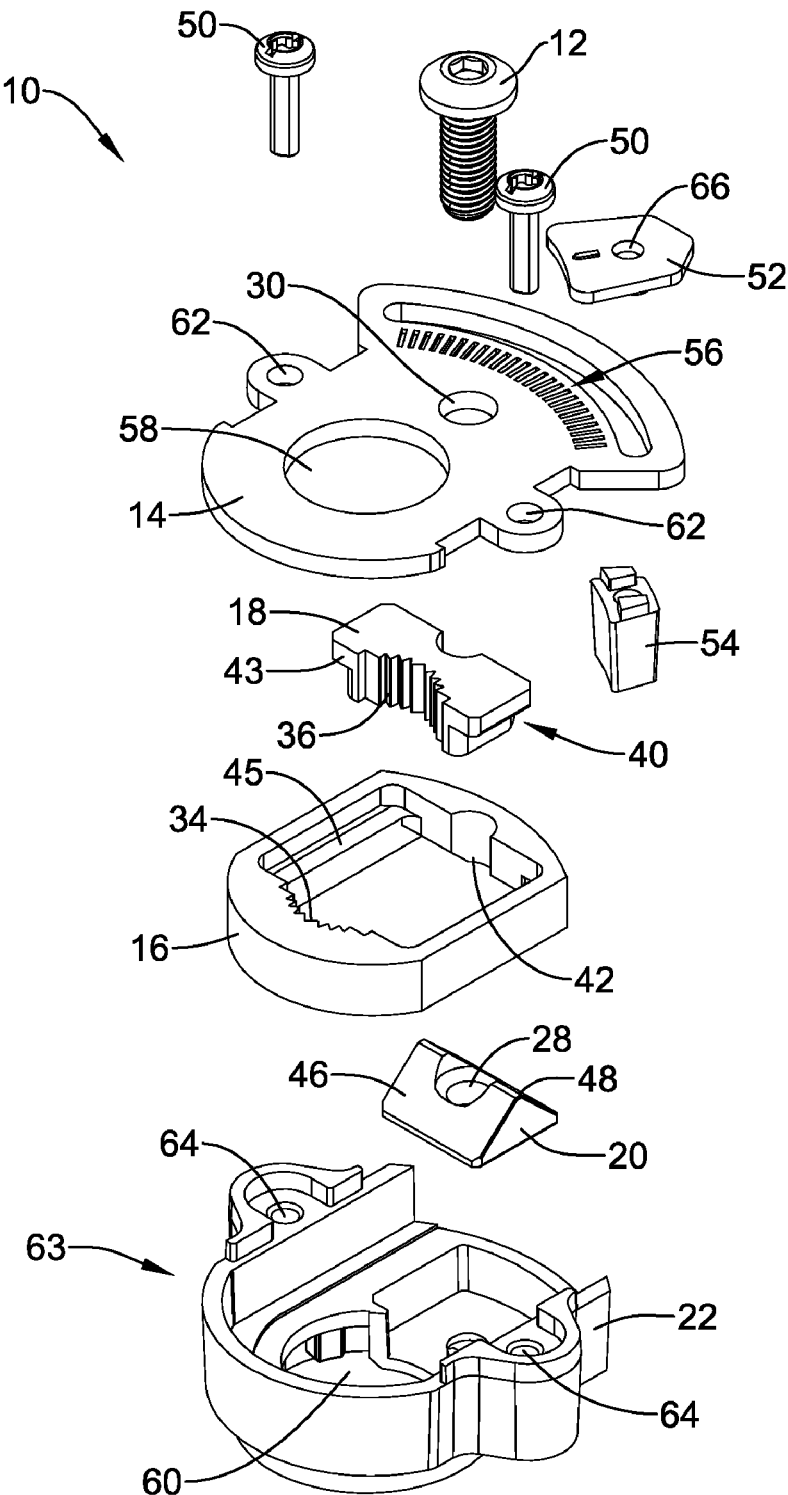
FIG. 3 is an exploded view of the illustrative self-centering shaft adapter of FIG. 1.

Specifically with respect to FIG. 3, the illustrative embodiment may include the inner jaw 18, the outer jaw 16, and an actuation mechanism or wedge 20, as described above. As best shown in FIG. 3, the shaft adapter 10 may also include a housing or cage 63. In the illustrative embodiment, the housing 63 may be configured to restrict the movement of the outer jaw 16 and/or inner jaw 18 in at least one direction. In other words, the housing or cage 63 may allow the inner jaw 18 and the outer jaw 16 to move in only one direction, such as, for example, along the moving axis as described above. In some cases, the inner jaw 18 and the outer jaw 16 may be constricted in any direction not along the axis.

As illustrated, the housing 63 may include an upper housing 14 and a lower housing 22. Together, the upper housing 14 and the lower housing 22 may include a top surface, a bottom surface, and one or more side surfaces surrounding the jaws 16 and 18 and wedge 20 of the self-centering shaft adapter 10. The top surface and bottom surface may each have an opening 58 and 60 aligned with each other and sized to receive a shaft therethrough. In some cases, some of the one or more side surfaces of the housing may be open, if desired.

In some cases, screws 50 may be provided through openings 62 in upper housing 14 and into threaded holes 64 in lower housing 22, and may secure the upper housing 14 to the lower housing 22. However, it is contemplated that the upper housing 14 may be secured to the lower housing 22 in any suitable manner, as desired.

In the illustrative embodiment, housing 63 may include a screw hole 30 configured to receive screw 12. In the illustrative embodiment, screw hole 30 may be in the upper housing 14 on the top surface of the housing. However, it is contemplated that screw hole 30 may be in the lower housing 22 or any other suitable position in the upper housing 14 or the lower housing 22, as desired. In some cases, screw hole 30 may be a non-threaded hole, but this is not required. In the illustrative embodiment, screw 12 may be inserted through screw hole 30, past the inner jaw 18 and the outer jaw 16, and threaded into at least a portion of a threaded opening 28 of wedge 20. In this configuration, the screw 12 may be in a fixed position relative to the housing, which, in turn, may fix the wedge 20 relative to the housing.

In this configuration, turning the screw 12 causes the wedge 20 to move inwards or outwards, depending on the direction of rotation of screw 12, and interact with the surfaces of the jaws 16 and 18, causing the inner jaw 18 and outer jaw 16 to move in opposite directions. In some cases, the distance of movement of the inner jaw 18 and the outer jaw 16 may be equal or substantially equal. In some cases, the movement of the inner jaw 18 and the outer jaw 16 may be perpendicular to direction of movement of the wedge 20.

In some cases, upper housing 14 and lower housing 22 may be secured relative to a hub of a drive unit. As such, as the drive unit hub moves, the shaft adapter 10 may rotate transferring the torque from the hub of the drive unit to the shaft.

In some cases, self-centering shaft adapter 10 may include an indicator 52, but this is not required. The indicator 52 may include a hole 66 and base 54 to mount to the actuatable control device, such as, for example, a non-rotating portion of the actuatable control device. In some cases, a screw or bolt may be inserted through hole 66 and through base 54 and secured to a non-rotating portion of the actuatable control device. In this configuration, as the shaft adapter 10 rotates the shaft, the indicator 52 may slide along scale 56 indicating the current position of the actuatable control device along its range of motion. In some cases, the indicator may be calibrated when the shaft adapter 10 is installed on the shaft.

It should be recognized that the foregoing housing is merely illustrative and it is contemplated that any suitable housing may be used, as desired. In some cases, the housing may include a single housing structure, an upper portion and a lower portion, multiple housing portions, or any other suitable housing arrangement, as desired.

Figure 4:
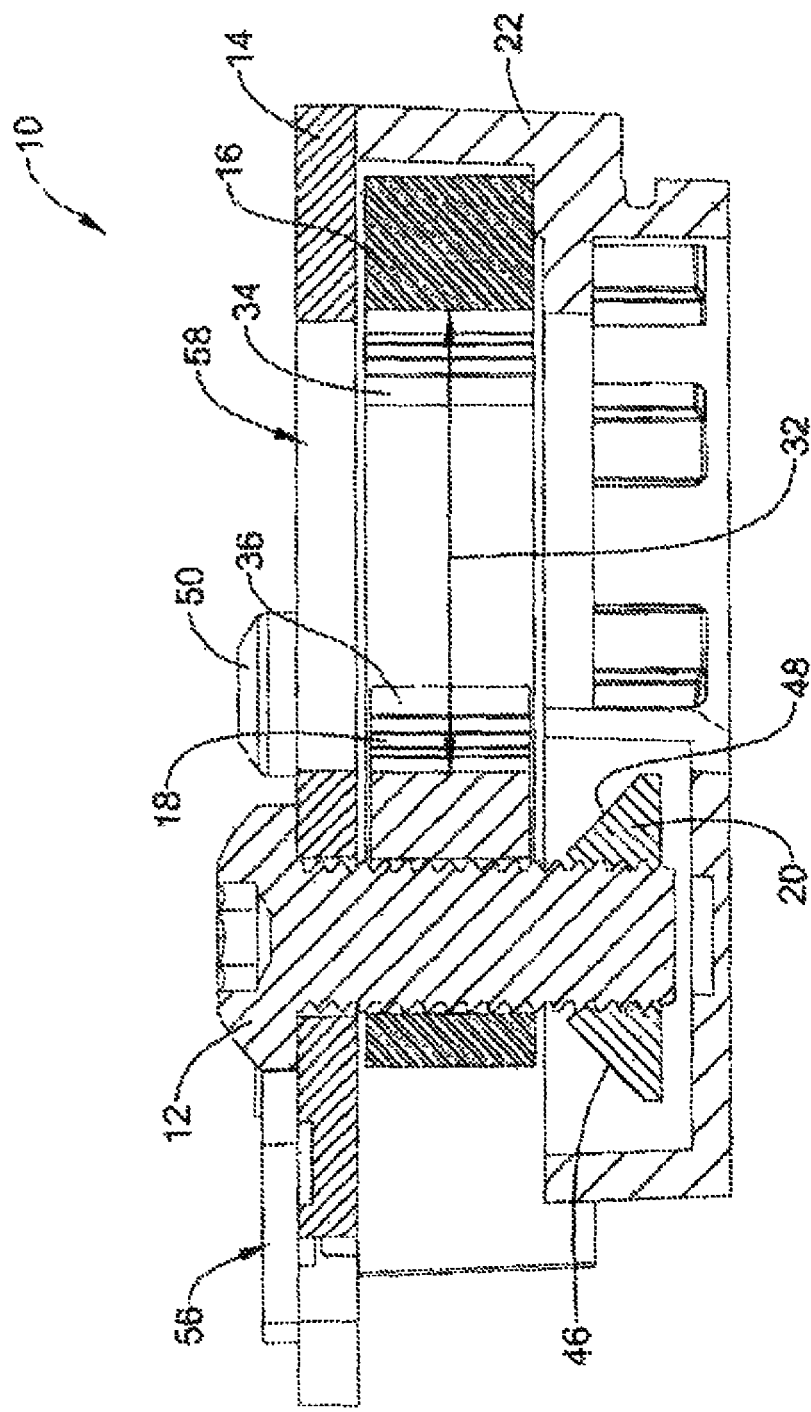
FIG. 4 is a cross-sectional view of the illustrative self-centering shaft adapter of FIG. 1 in a fully open position.

FIG. 4 is a cross-sectional view of the illustrative self-centering shaft adapter 10 of FIG. 1 along line 4-4 in a fully open position. In the illustrative position, wedge 20 is positioned towards the bottom end of screw 12 and may exert no or little force upon jaws 16 and 18. In this configuration, the face 36 of inner jaw 18 and the face 34 of outer jaw 16 may define the opening 32 having a first, relatively large diameter.

Figure 5:
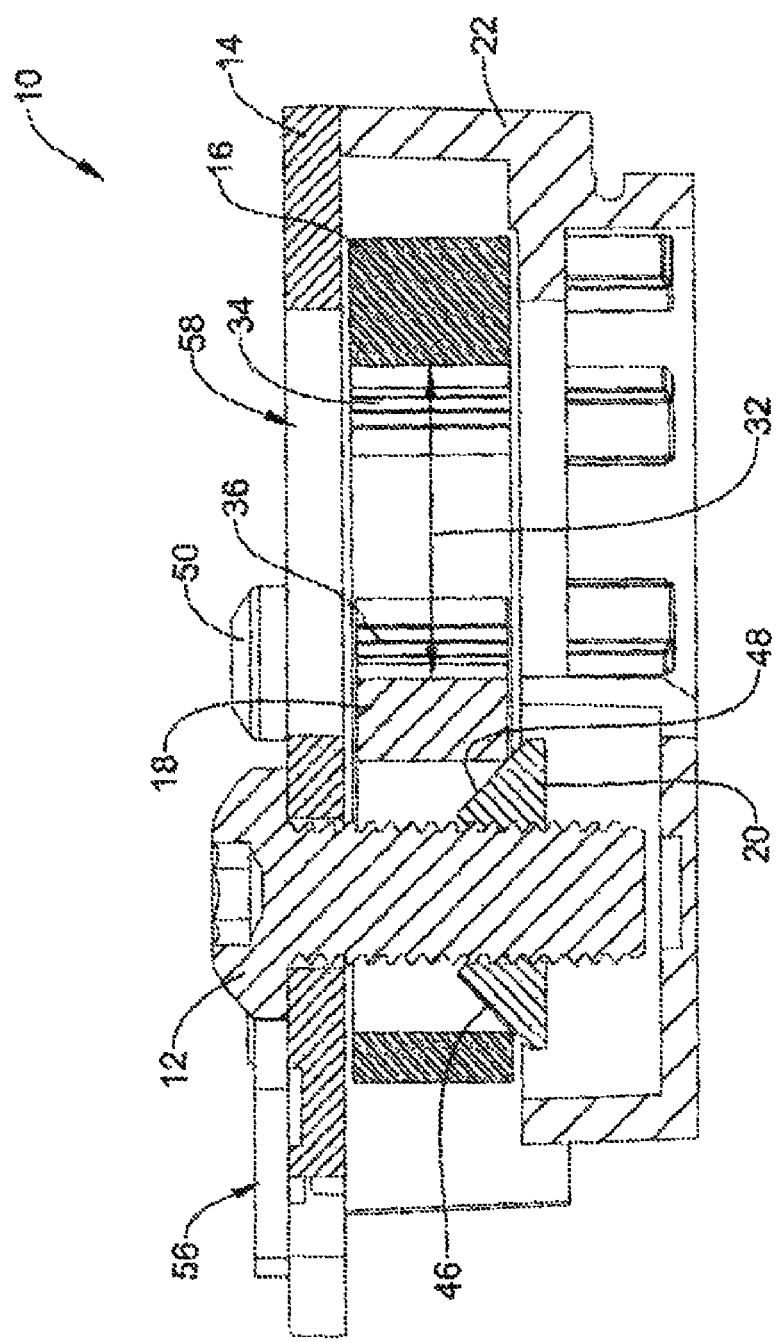
FIG. 5 is a cross-sectional view of the illustrative self-centering shaft adapter of FIG. 1 in a partially open position.

FIG. 5 is a cross-sectional view of the illustrative self-centering shaft adapter of FIG. 4 along line 4-4 in a partially open position. In this position, wedge 20 is urged in a relative inward direction on screw 12 causing the angled sides 46 and 48 to contact angled sides 40 and 42 of the inner jaw 18 and the outer jaw 16, respectively (shown better in FIG. 2). Because of the cross-section shown in FIGS. 4 and 5 passes through recess 41, the angled sides 46 and 48 of the inner jaw 18 and the outer jaw 16 cannot be seen.

As wedge 20 is urged up, it may exert a force on inner jaw 18 and outer jaw 16 moving inner jaw 18 and outer jaw 16 in a direction away from the screw 12 or in a perpendicular direction to the movement of the wedge 20. This movement may cause the face 36 of inner jaw 18 and the face 34 of outer jaw 16 to move toward one another, decreasing the diameter of opening 32 to a second, relatively smaller diameter. In this configuration, the inner jaw 18 and the outer jaw 16 move the same or substantially the same distance. Thus, the center of opening 32 may remain relatively constant between the first diameter and the second diameter, and may be referred to as a self-centering shaft adapter 10.

Figure 6:
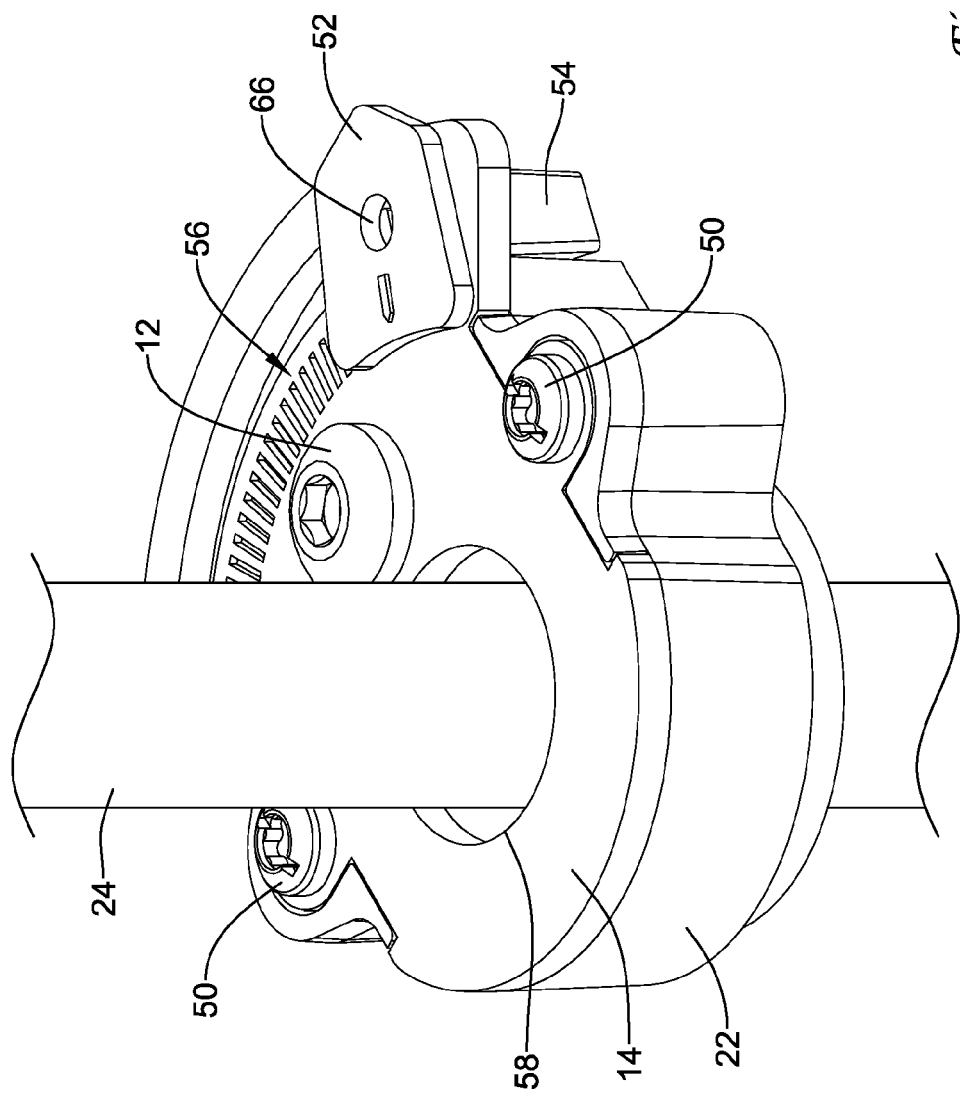
FIG. 6 is a perspective view of the illustrative self-centering shaft adapter of FIG. 1 coupled to an illustrative shaft.

FIG. 6 is a perspective view of the illustrative self-centering shaft adapter of FIG. 1 coupled to a shaft. In the illustrative embodiment, shaft 24 has been inserted into opening 32 of the shaft adapter 10. Screw 12 has been turned, urging the wedge 20 between at least a portion of inner jaw 18 and outer jaw 16 creating movement in the jaws 16 and 18 and causing the inner jaw 18 and the outer jaw 16 to contact the outer surface of the shaft 24. When sufficient pressure is applied, the shaft adapter 10 may be secured to the shaft 24.

In some embodiments, the shaft 24 may be a shaft of an actuatable control device such as a damper, a valve, a ventilation flap, a louver, or the like. Once coupled together, the self-centering shaft adapter 10 may, through movement provided by a drive unit (not shown), transfer a torque to the shaft 24 to actuate the position of actuatable control device. In some cases, the self-centering shaft adapter 10 may be configured to exert a torque of about 150 in-lbs, 100 in-lbs, 88 in-lbs, 50 in-lbs, 44 in-lbs, or any other suitable amount of torque, as desired.

Figure 7:
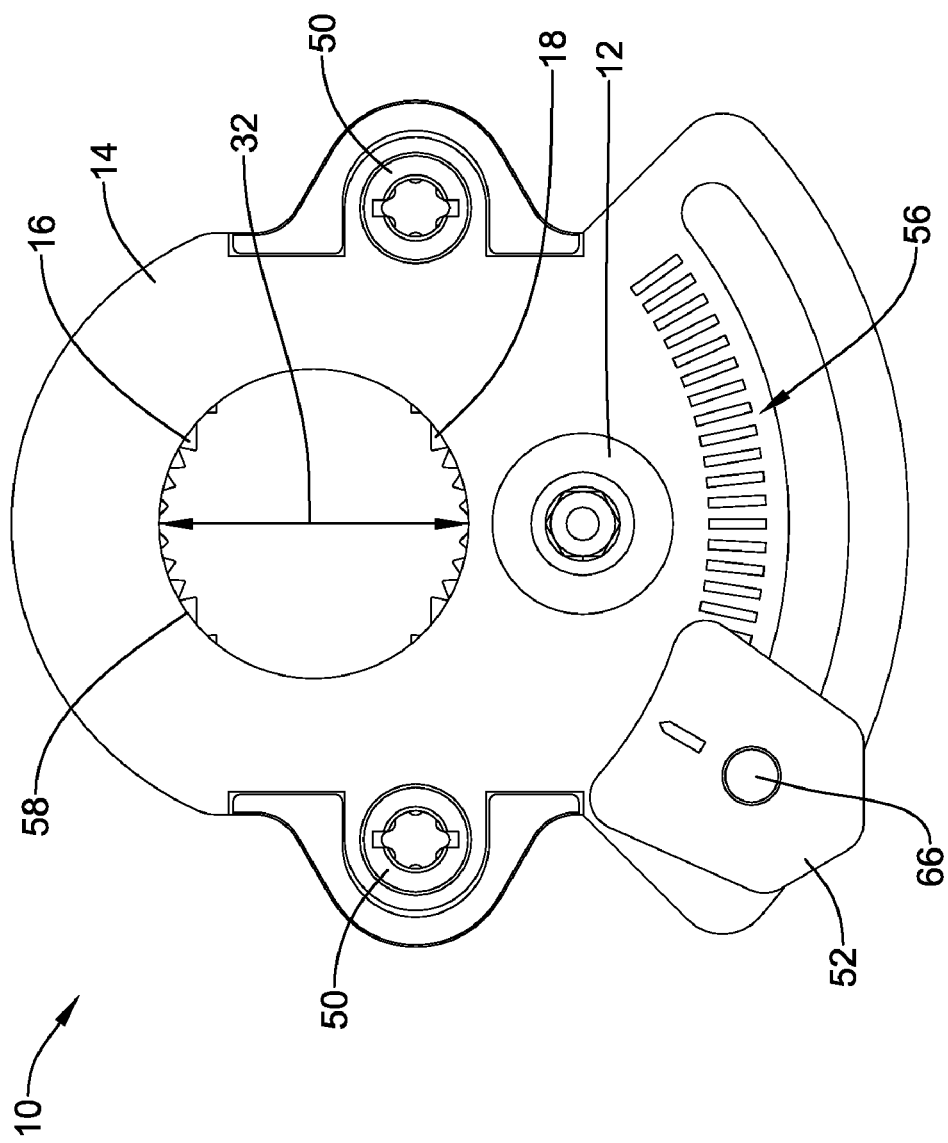
FIG. 7 is a top perspective view of the illustrative self-centering shaft adapter of FIG. 1.
Figure 8:
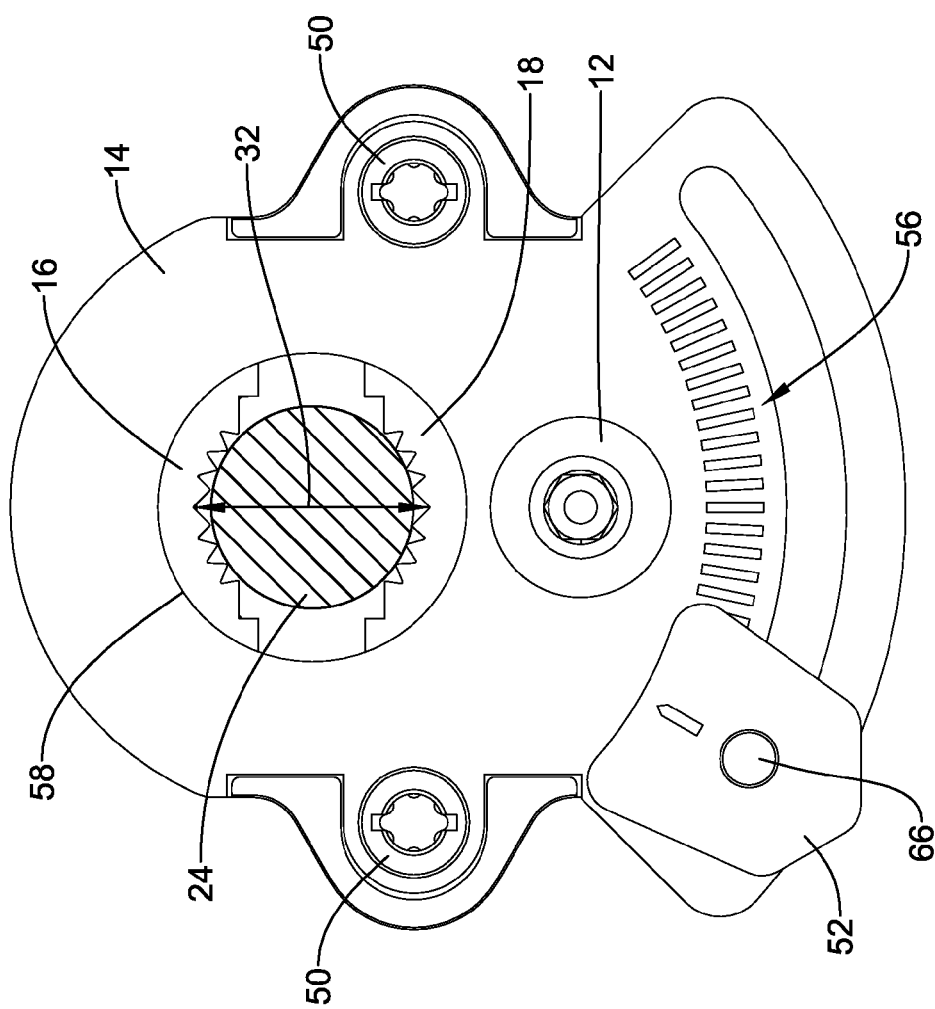
FIG. 8 is a top perspective view of the illustrative self-centering shaft adapter of FIG. 7 coupled to an illustrative shaft.

FIG. 7 is a top perspective view of the illustrative self-centering shaft adapter of FIG. 1. This illustrative view shows the shaft adapter 10 having an opening 32 having a first diameter. FIG. 8 is a top perspective view of the illustrative self-centering shaft adapter of FIG. 7 coupled to an illustrative shaft. When the illustrative shaft 24 is inserted into the shaft adapter 10, screw 12 may be turned by a user or installer. In some cases, when turned, jaws 16 and 18 may move towards the shaft 24 to a second, smaller diameter, wherein the jaws 16 and 18 contact at least a portion of the outer surface of the shaft 24. As illustrated, jaws 16 and 18 each may move about the same distance, but in opposite directions, providing a concentric self-centering alignment with the shaft 24 and opening 32.

To release the shaft 24, screw 12 may be turned in an opposite direction causing the wedge 20 to move in a relative outward direction, which, in turn, moves the face 36 of inner jaw 18 and the face 34 of outer jaw 16 to move away from one another, thereby increasing the diameter of opening 32 and releasing shaft 24.

In the illustrative embodiment, shaft 24 is merely illustrative. It is contemplated that any suitable shaft of any size and/or shape shaft 24 may be used, as desired. Furthermore, it is contemplated that in some cases, shaft 24 may have one or more threads, grooves, splines, or any other outer surface structure, as desired.

Figure 9:
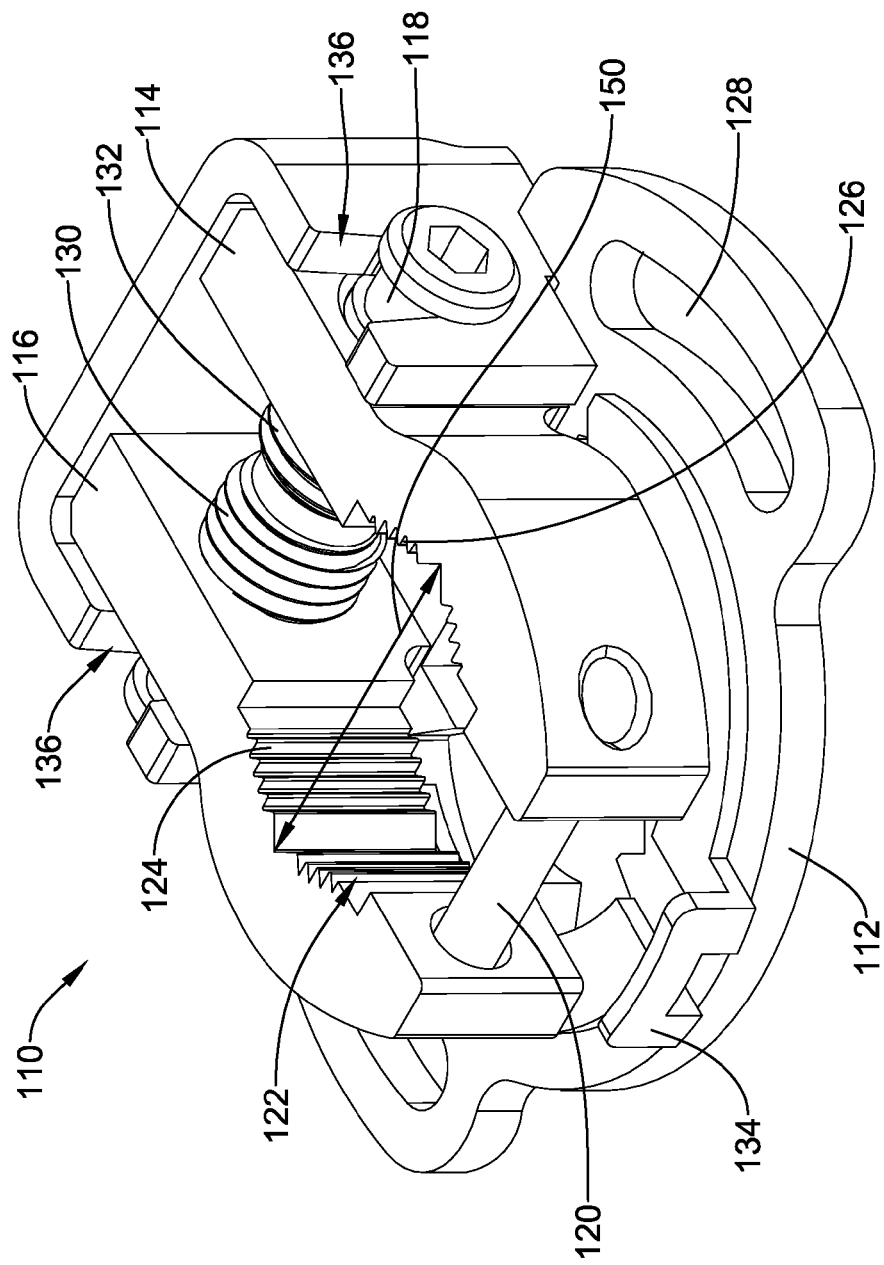
FIG. 9 is a perspective view of another illustrative embodiment of a self-centering shaft adapter.

FIG. 9 is a perspective view of another illustrative embodiment of a self-centering shaft adapter 110. Similar to the self-centering shaft adapter 10 of FIG. 1, the illustrative self-centering shaft adapter 110 may be used in conjunction with an actuatable control device. The illustrative self-centering shaft adapter 10 includes an opening 122 to receive a shaft, and may transfer a torque from a drive unit to the shaft to actuate the position of the actuatable control device.

In the illustrative embodiment, opening 122 of self-centering shaft adapter 110 may be defined by a first jaw 114 and a second jaw 116. An actuation mechanism 118 can be provided to adjust the diameter of opening 122 by moving the first jaw 114 and/or the second jaw 116. In some cases, the opening 122 may be adjustable to accommodate shafts of various shapes and/or sizes.

In some cases, the self-centering shaft adapter 110 may provide a concentric or coaxial alignment of the shaft with the opening 122, and thus in this sense, may be "self-centering". First jaw 114 and second jaw 116 may be configured to move in opposite directions. In some cases, first jaw 114 and second jaw 116 may be configured to move about the same distance in opposite directions. In other words, the shaft may be positioned and secured relative to the shaft adapter 110 along the same axis regardless of the size and/or shape of the shaft.

Figure 10:
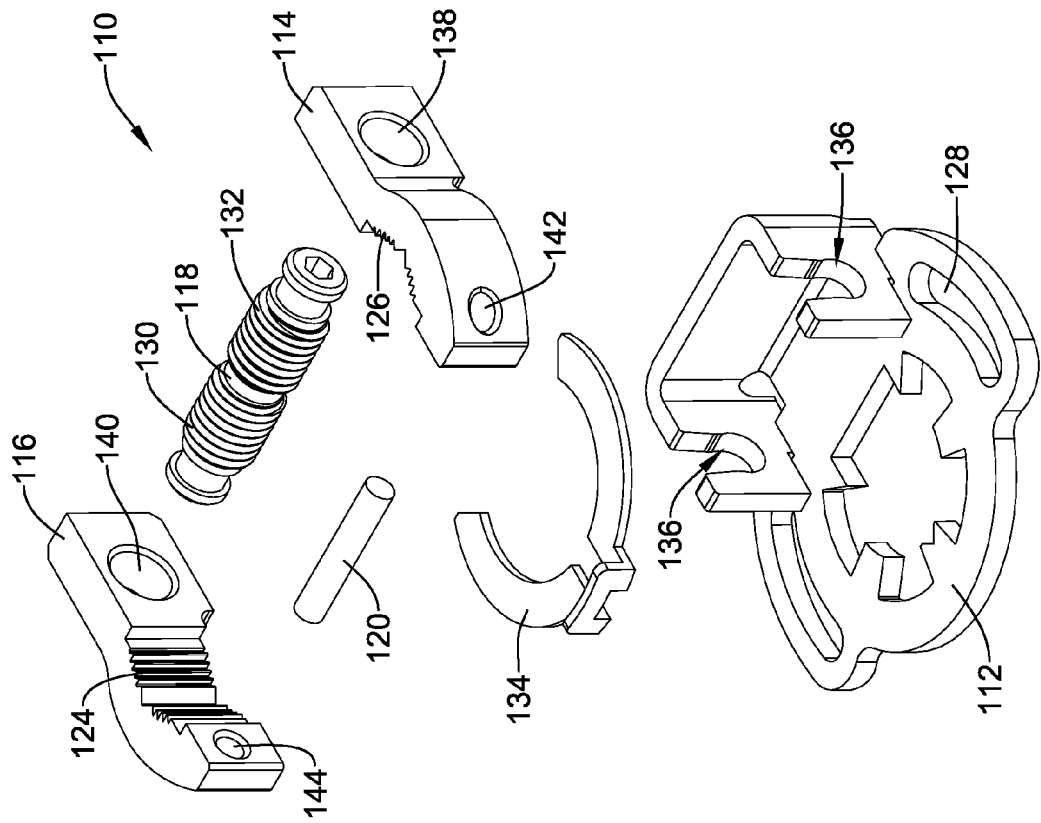
FIG. 10 is an exploded view of the illustrative self-centering shaft adapter of FIG. 9.

FIG. 10 is an exploded view of the illustrative self-centering shaft adapter 110 of FIG. 9. The self-centering shaft adapter 110 includes a first jaw 114, a second jaw 116, and an actuation mechanism 118. In this illustrative embodiment, the actuation mechanism 118 is a threaded bolt or screw 118.

As illustrated, the actuation mechanism may be a double-threaded screw 118 that includes a first threaded portion 132 having a first thread direction and a second threaded portion 130 having a second thread direction. In some cases, the first thread direction and the second thread direction may be opposite each other. For example, the first thread direction may be a right-handed thread and the second thread direction may be a left-handed thread, or visa-versa. In some cases, the first threaded portion 132 and the second threaded portion 130 may have the same or substantially similar pitches, but this is not always required.

In the illustrative embodiment, jaw 114 may include a threaded hole 138 that may be threaded onto first threaded portion 132 of double-threaded screw 118. In some cases, opening 138 may be positioned near a first end of jaw 114. Another hole 142 may be positioned adjacent to the second end of jaw 114, but this is not required. In some cases, hole 142 may be configures to slidably receive a pin 120.

Jaw 114 may also include a face 126 positioned between hole 138 and hole 142. In some cases, face 126 may be configured to contact at least a portion of a shaft disposed within the shaft adapter 110. In some cases, face 126 may include a curved portion. In one case, curved portion of the face 126 may be generally semi-circular in shape. However, it is contemplated that any suitable shape may be used, depending on the application.

Face 126 may include a surface configured to reduce slippage between the shaft and face. For example, face 126 may include one or more protrusions, grooves, splines, or teeth, which may engage, in part, a portion of the shaft. Alternatively, or in addition, face 126 may have a high friction surface or include a coating to help reduce slippage between face 126 and the shaft. However, it is contemplated that any suitable surface of face 126 may be used, as desired.

In the illustrative embodiment, jaw 116 may also include a threaded hole 140 that may be threaded onto the second threaded portion 130 of double-threaded screw 118. In some cases, opening 140 may be positioned near a first end of jaw 116. In some cases, another hole 144 may be positioned adjacent to the second end of jaw 116, and may be configured to slidably receive pin 120.

Jaw 116 may also include a face 124 positioned between hole 140 and hole 144. In some cases, face 124 may be configured to contact at least a portion of a shaft disposed within the shaft adapter 110. In some cases, face 124 may include a curved portion. In one case, curved portion of the face 124 may be generally semi-circular in shape. However, it is contemplated that any suitable shape may be used, depending on the application.

In some cases, face 124 may include a surface configured to reduce slippage between the shaft and face. For example, face 124 may include one or more protrusions, grooves, splines, or teeth, which may engage, in part, a portion of the shaft. Alternatively, or in addition, face 124 may have a high friction surface or include a coating to help reduce slippage between face 124 and the shaft. However, it is contemplated that any suitable surface of face 124 may be used, as desired.

In the illustrative embodiment, jaw 114 and jaw 116 may be threaded onto screw 118 an equal or substantially equal distance, but this is not required. In this case, as screw 118 is turned, a force may be exerted upon jaw 114 and jaw 116, and the force may cause jaw 114 and jaw 116 to move in opposite directions. In some cases, jaws 114 and 116 may move in a direction parallel to the longitudinal axis of screw 118. When provided, pin 120 may be slidably inserted through holes 142 and 144, which, in some cases, may help reduce the jaws 114 and 116 from becoming skewed or offset.

In the illustrative embodiment, a housing 112 may be provided adjacent to jaws 114 and 116. Housing 112 may include an opening therein to accommodate a shaft. In some cases, housing 112 may constrict the movement of jaws 114 and 116 in at least one direction. In one case, housing 112 may constrict the movement of jaws 114 and 116 in any direction except along an axis parallel to the longitudinal axis of screw 118. In some cases, housing 112 may help increase the mechanical integrity of shaft adapter 110.

In the illustrative embodiment, housing 112 may include recesses 136 configured to receive screw 118. In some cases, recesses 136 may secure screw 118 therein. For example, screw 118 may have a corresponding recessed groove 119 that helps lock the screw 118 into the slot 136 and prevent lateral movement of screw 118, if desired.

Housing 112 may also include one or more mounting holes 128, which may secure the shaft adapter 110 to a drive unit or the like. In some cases, one or more screws may be provided through mounting holes 128 to secure the housing to the drive unit, but this is not required. In some cases, housing 112 may include a generally U-shaped support piece 134. The support piece 134 may help maintain the jaws 114 and 116 in a position around the opening in housing 112.

It is contemplated that self-centering shaft adapter 110 may include an indicator, similar to indicator 52 described above, but this is not required. In this case, as the shaft adapter 110 rotates the shaft, the indicator may slide along a scale indicating the current position of the actuatable control device along its range of motion.

Figure 11:
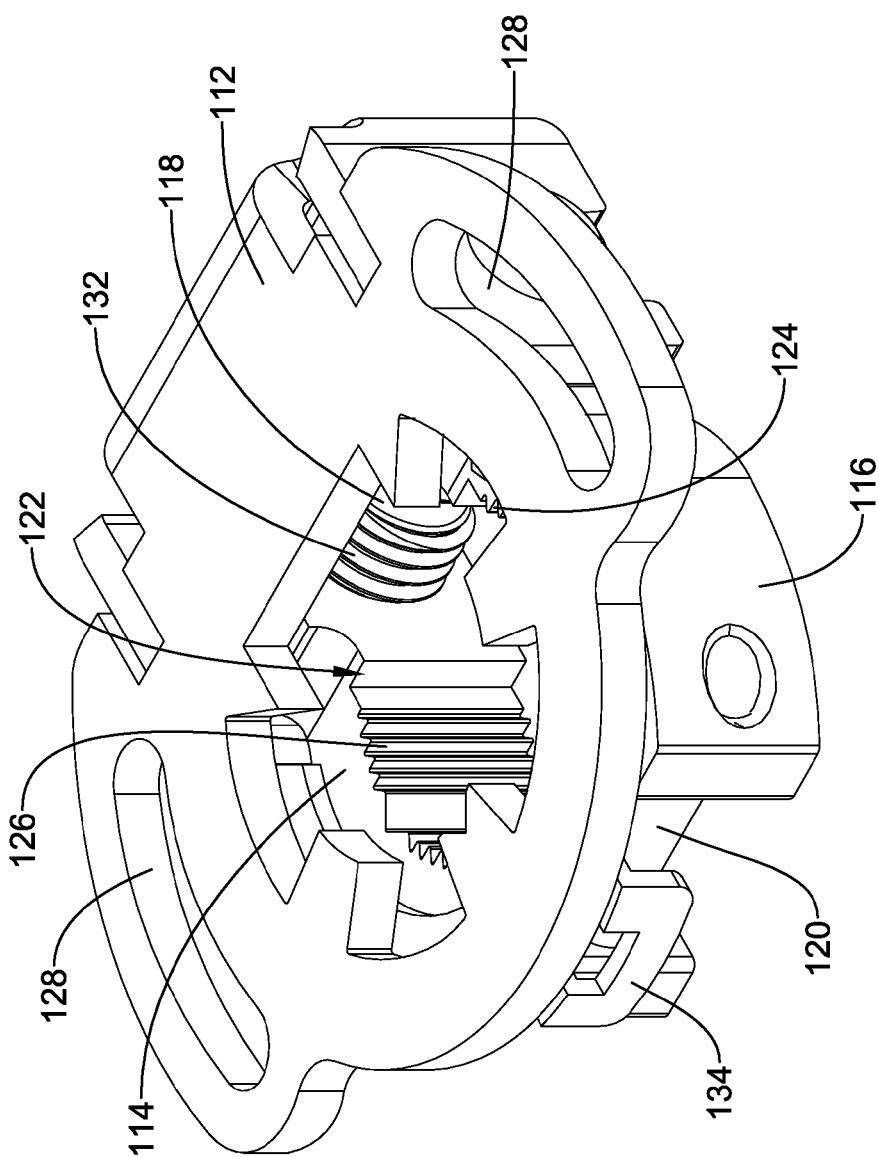
FIG. 11 is a bottom perspective view of the illustrative self-centering shaft adapter of FIG. 9.

FIG. 11 is a bottom perspective view of the illustrative self-centering shaft adapter 110 of FIG. 9. The illustrative view shows the housing 112 of the shaft adapter 110. As can be seen, housing 112 may include an opening to receive a shaft. As illustrated, the housing 112 opening may include one or more recesses and protrusions to help guide the shaft, but this is not required.

Figure 12:
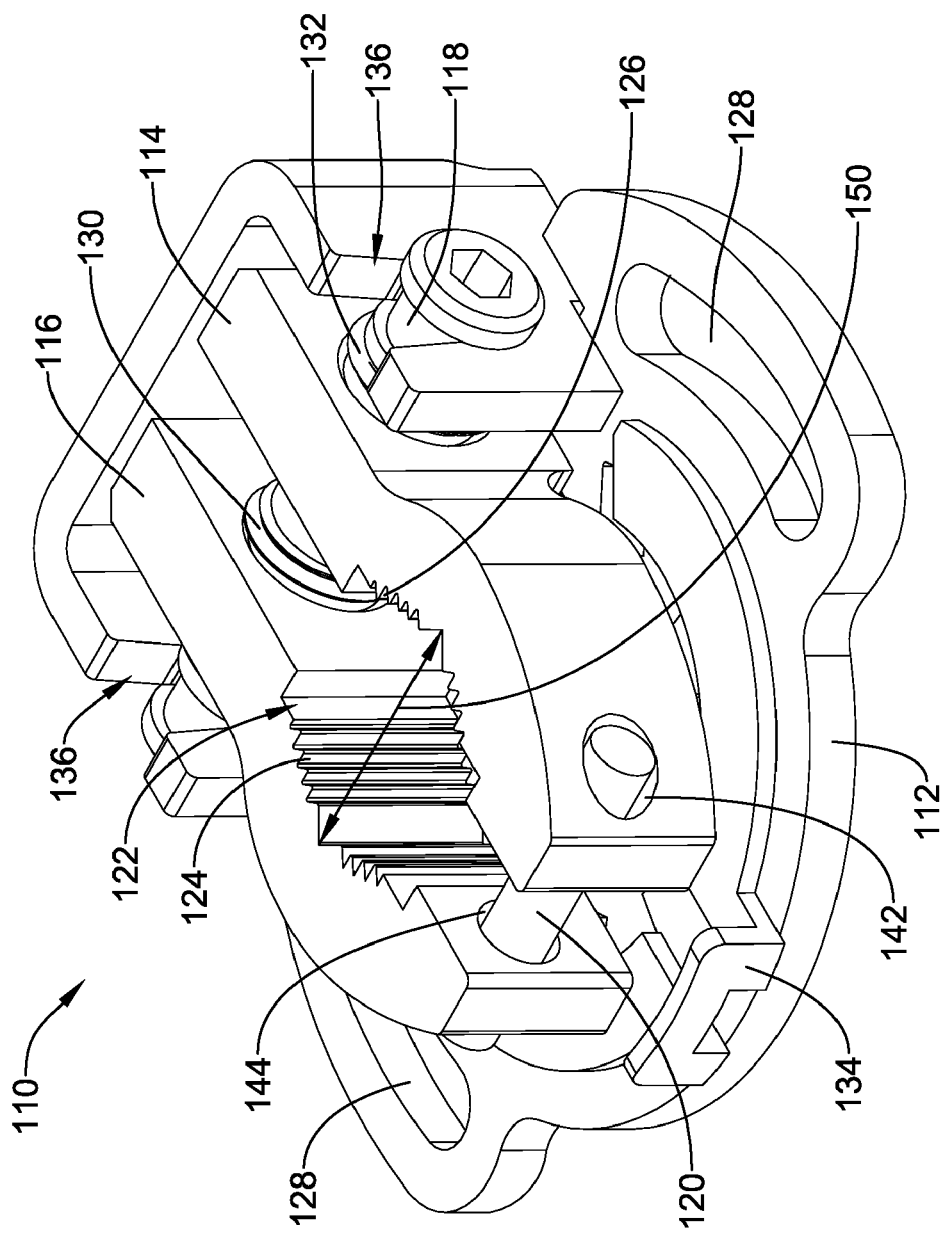
FIG. 12 is a perspective view of the illustrative self-centering shaft adapter of FIG. 9 in a partially open position.

FIG. 12 is a perspective view of the illustrative self-centering shaft adapter 110 of FIG. 9 in a partially open position. In this position, the screw 118 has been turned, causing the jaws 114 and 116 to move towards each other decreasing the diameter 150 of opening 122. As illustrated, pin 120 slides through openings 142 and/or 144 guiding the ends of the jaws and allowing them to close. In some cases, the force of the screw 118 acting upon the jaws 114 and 116 may be the same or similar force in opposite direction. The illustrative force of screw 118 may act upon jaws 114 and 116 along an axis parallel to screw 118, but in opposite directions.

Figure 13:
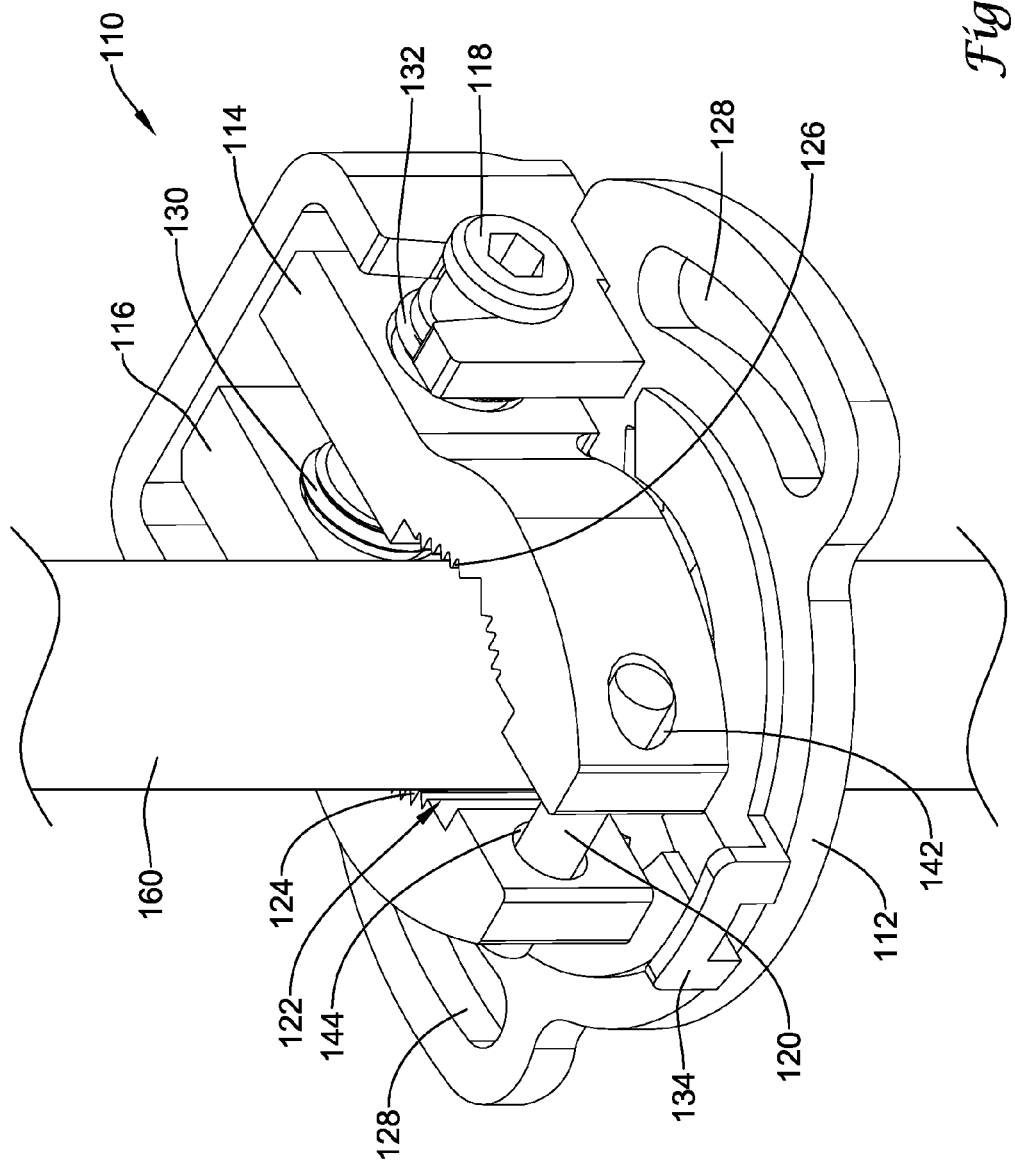
FIG. 13 is a perspective view of the illustrative self-centering shaft adapter of FIG. 12 coupled to an illustrative shaft.

FIG. 13 is a perspective view of the illustrative self-centering shaft adapter 110 of FIG. 12 coupled to a shaft 160. As shaft 160 is inserted into opening 122 of the shaft adapter 110, screw 118 may be turned, thereby causing jaws 114 and 116 to move to a smaller diameter in which, jaws 114 and 116 may contact at least a portion of the outer surface of shaft 160. Once the screw 118 is sufficiently turned, the shaft adapter 110 may become secured to the shaft 160.

Figure 14:
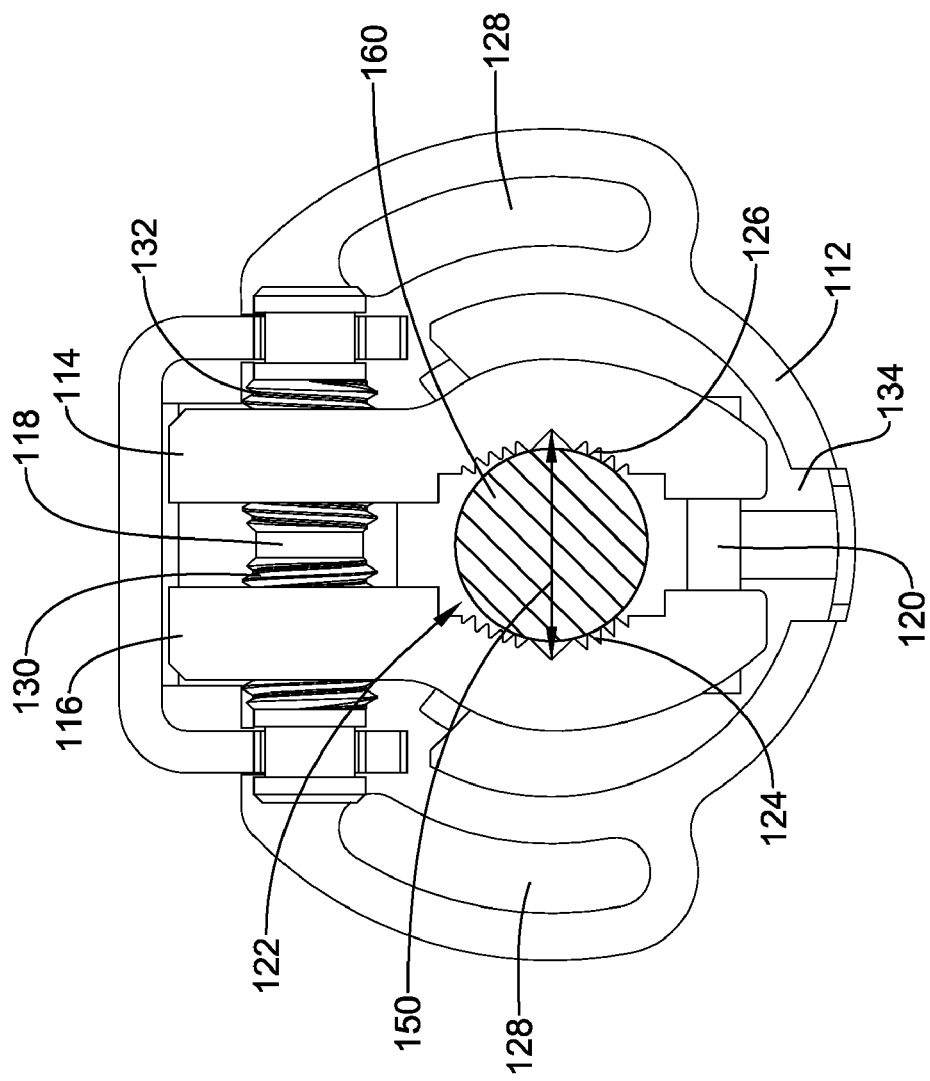
FIG. 14 is a top perspective view of the illustrative self-centering shaft adapter of FIG. 13.

FIG. 14 is a top perspective view of the illustrative self-centering shaft adapter of FIG. 13. As illustrated, as screw 118 is turned jaws 114 and 116 move about the same distance toward the shaft 160. In some cases, this may be due, in part, to the opposite orientation of threaded portions 130 and 132 and/or the same or similar pitch of threaded portions 130 and 132. In some cases, the illustrative jaws 114 and 116 may provide a concentric or coaxial relationship between shaft 160 and opening 122, regardless of the size 150 of the opening, and thus may be thought of as being self-centering.

Figure 15:
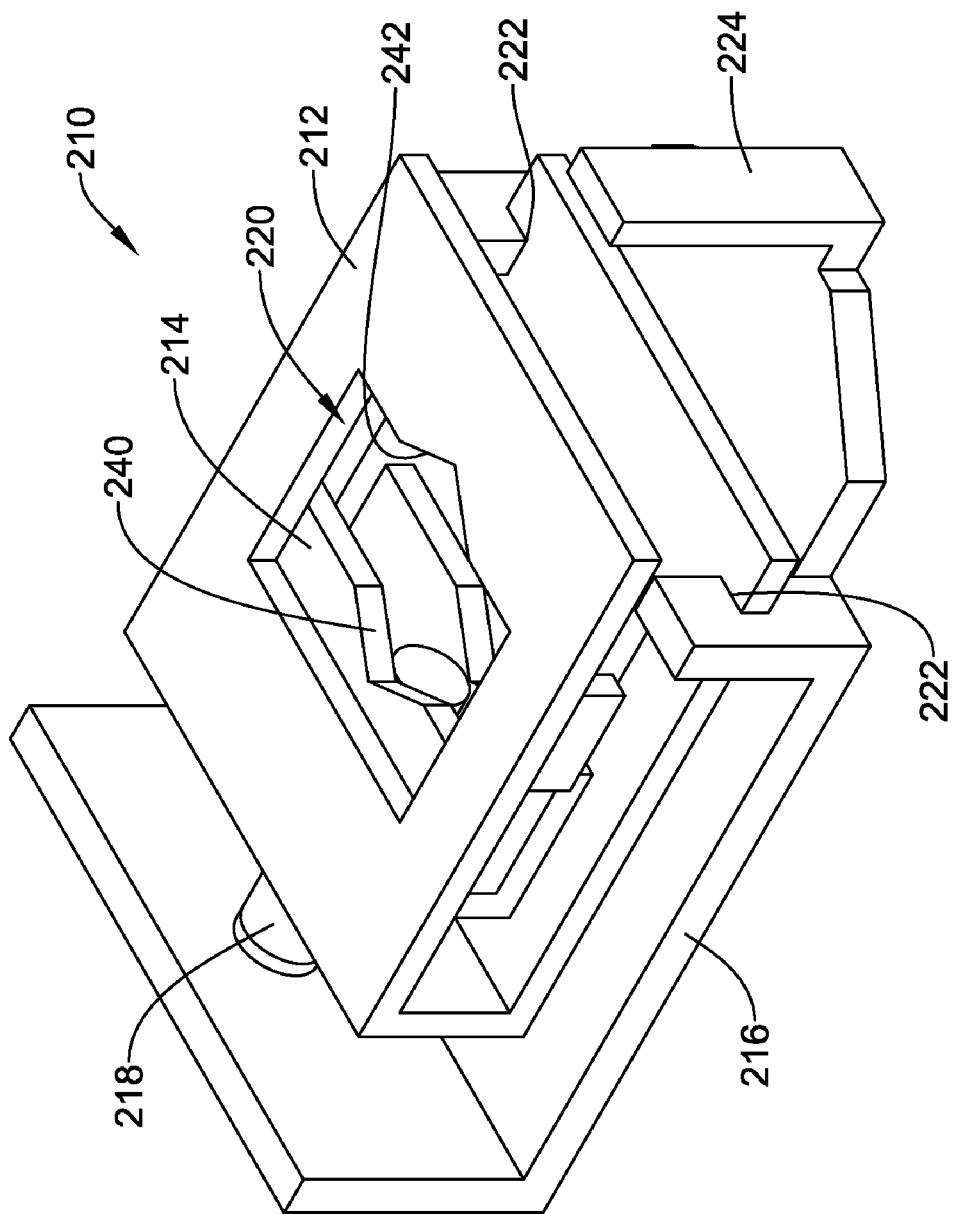
FIG. 15 is a perspective view of an illustrative embodiment of another self-centering shaft adapter.

FIG. 15 is a perspective view of an illustrative embodiment of another self-centering shaft adapter 210. Similar to the self-centering shaft adapters 10 and 110 of FIGS. 1 and 9, the illustrative self-centering shaft adapter 210 may be used in conjunction with an actuatable control device. The illustrative self-centering shaft adapter 210 includes an opening 220 to receive a shaft, and may transfer a torque from a drive unit to the shaft to actuate the position of the actuatable control device.

In the illustrative embodiment of FIG. 15, the opening 220 of self-centering shaft adapter 210 may be defined by a first jaw 212 and a second jaw 214. An actuation mechanism 218 can be provided to adjust the size of opening 220 by moving the first jaw 212 and the second jaw 214. In some cases, the opening 220 may be adjustable to accommodate shafts of various shapes and/or sizes.

In some cases, the self-centering shaft adapter 210 may provide a concentric or coaxial alignment of the shaft with the opening 220. To accomplish this, in some cases, first jaw 212 and second jaw 214 may be configured to move in substantially equal but opposite directions. When so provided, the shaft may be positioned along a common axis relative to the shaft adapter 210 regardless of the size and/or shape of the shaft.

In the illustrative embodiment, the actuation mechanism may be a double-threaded bolt or screw 218. In the illustrative example, double-threaded screw 218 may include a first threaded portion 232 (shown best in FIGS. 16-18) having a first thread direction and a second threaded portion 230 (best shown in FIGS. 16-18) having a second thread direction. In some cases, the first thread direction and the second thread direction may be opposite to each other. For example, the first thread direction may be a right-handed thread direction and the second thread direction may be a left-handed thread direction, or visa-versa. In some cases, the first threaded portion 232 and the second threaded portion 230 may have the same or substantially similar thread pitches, but this is not required.

In the illustrative embodiment, the inner jaw 214 may be a generally U-shaped structure. As illustrated, the generally U-shaped structure may include two arms connected at one end by a cross bar portion. However, it is contemplated that any suitable shaped inner jaw 214 may be used, as desired. In some cases, the inner jaw 214 may include a threaded opening in the cross bar portion of the generally U-shaped structure to receive the second threaded portion 230 of the double-threaded screw 218. In the illustrative embodiment, threaded opening of inner jaw 214 may be threaded onto the second threaded portion 230 of double-threaded screw 218.

Inner jaw 214 may include a face 240 positioned at the end of the arms opposite the cross bar portion. In some cases, face 240 may be configured to contact at least a portion of a shaft disposed within the shaft adapter 210. In some cases, face 240 may include a curved portion or v-shaped portion. However, it is contemplated that any suitable shape may be used, depending on the application.

It is contemplated that face 240 may include a surface configured to reduce slippage between the shaft and face. For example, face 240 may include one or more protrusions, grooves, splines, or teeth, which may engage, in part, a portion of the shaft. Alternatively, or in addition, face 240 may be a high friction surface or include a coating to help reduce slippage between face 240 and the shaft. However, it is contemplated that any suitable surface of face 240 may be used, as desired.

In the illustrative embodiment, the outer jaw 212 may also be a generally U-shaped structure. As illustrated, the generally U-shaped structure of outer jaw 212 may include two arms connected at one end by a cross bar portion. However, it is contemplated that any suitable shaped outer jaw 212 may be used, as desired. In some cases, the outer jaw 212 may include a threaded opening in the cross bar portion of the generally U-shaped structure to receive the first threaded portion 232 of the screw 218.

Outer jaw 212 may include a face 242 positioned at the end of the arms opposite the cross bar portion. In some cases, face 242 may be configured to contact at least a portion of a shaft disposed within the shaft adapter 210. In some cases, face 242 may include a curved portion or v-shaped portion. However, it is contemplated that any suitable shape may be used, depending on the application.

It is contemplated that face 242 may include a surface configured to reduce slippage between the shaft and face. For example, face 242 may include one or more protrusions, grooves, splines, or teeth, which may engage, in part, a portion of the shaft. Alternatively, or in addition, face 242 may be a high friction surface or include a coating to help reduce slippage between face 242 and the shaft. However, it is contemplated that any suitable surface of face 242 may be used, as desired.

In the illustrative embodiment, face 240 and 242 may define, in part, an opening 220 that is sized to receive a shaft. In some cases, the size of opening 220 may be changed by moving the jaw 212 and jaw 214 via double-threaded screw 218. In some cases, double-threaded screw 218 may exert a force upon jaw 212 and jaw 214, which, in some cases, may create a movement in jaws 212 and 214 in opposite directions. In some cases, movement of jaws 212 and 214 may be in a direction along the longitudinal axis of screw 218.

In the illustrative embodiment, shaft adapter 210 may include a housing 216. In some cases, the housing 216 may be configured to restrict the movement of the inner jaw 214 and/or outer jaw 212 in at least one direction. In the illustrative embodiment, housing 216 may include an opening configured to receive at least a portion of a shaft therethrough. In some cases, the opening in the housing 216 may be aligned with opening 220, but this is not required.

Housing 216 may also include one or more notches 222 configured to contact at least a portion of outer jaw 212. The one or more notches 222 may help to reduce movement in the outer jaw 212 and help reduce twisting of the outer jaw 212. Notches 222 may allow movement of the outer jaw 212 in a direction along the longitudinal axis of the screw 218.

In some cases, double-threaded screw 218, which may be positioned through an opening in one end of the housing, may help restrict movement of the outer jaw 212 in at least one direction. For example, double-threaded screw 218 may help to restrict movement in a direction perpendicular to the longitudinal axis of double-threaded screw 218. In some cases, outer jaw 212 may in turn, restrict movement of the inner jaw 214.

In some cases, housing 216 may also include a post 224, which may help reduce movement of the outer jaw past a horizontal limit, such as, for example, to prevent the outer jaw from unthreading off of the end of double-threaded screw 218. However, it is contemplated that any suitable housing may be used, as desired.

Figure 16:
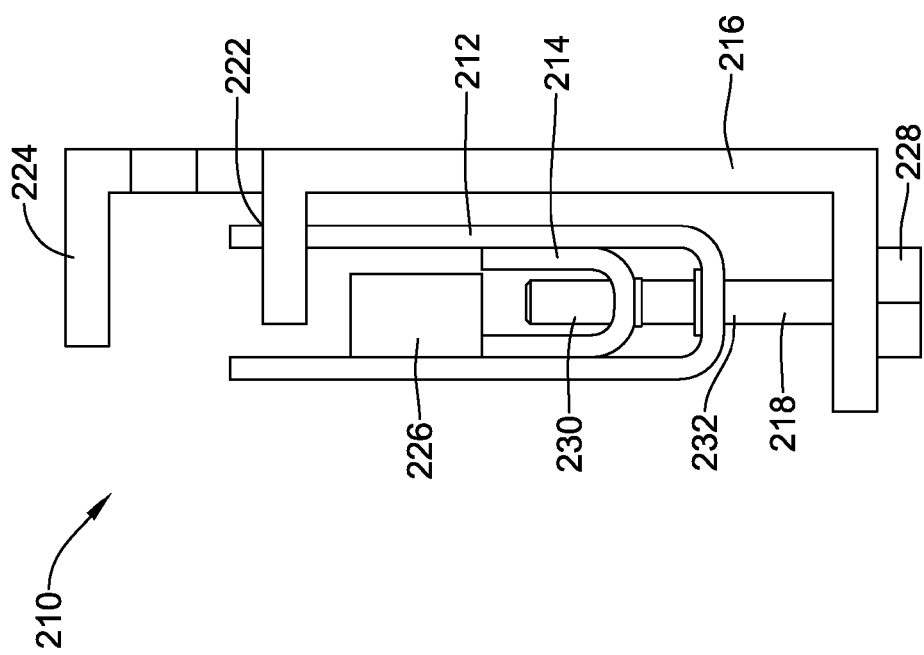
FIG. 16 is a side perspective view of the illustrative self-centering shaft adapter of FIG. 15.

FIG. 16 is a side perspective view of the illustrative self-centering shaft adapter of FIG. 15. As illustrated, double-threaded screw 218 may include threaded portions 230 and 232 which may pass through an opening in housing 216, and may have a screw head 228 that is larger than the opening. As screw head 228 is turned, inner jaw 214 and outer jaw 212 move in opposite directions due to the opposite thread directions of threaded portions 230 and 232. In the illustrative embodiment, notch 222 may help reduce twisting in outer jaw 212 and outer jaw 212 may help reduce twisting of inner jaw 214. In some cases, outer jaw 212 may include portion 226 to help define opening 220 and/or reduce twisting of inner jaw 214.

Figure 17:
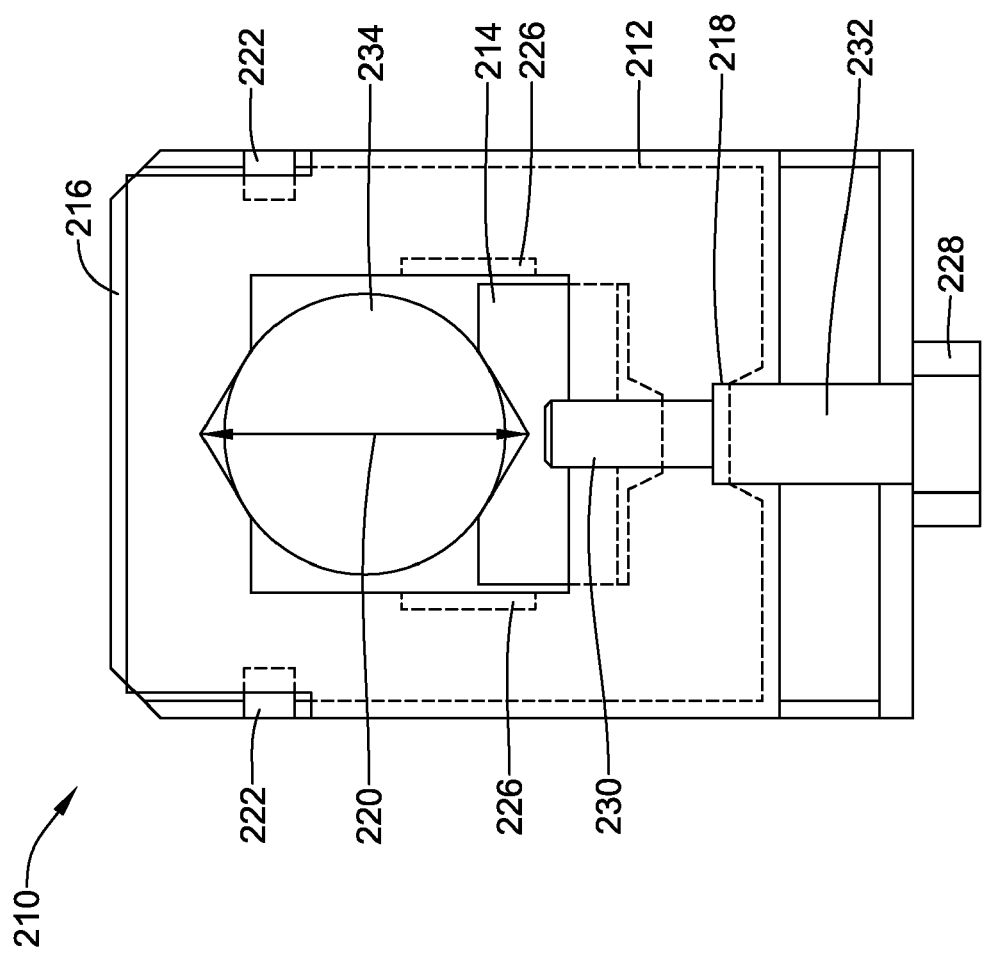
FIG. 17 is a top schematic view of the illustrative self-centering shaft adapter of FIG. 15 coupled to an illustrative shaft.

FIG. 17 is a top schematic view of the illustrative self-centering shaft adapter of FIG. 15 coupled to an illustrative shaft 234. In the illustrative embodiment, threaded portion 230 may be threadably coupled to inner jaw 214 and threaded portion 232 may be threadably coupled to outer jaw 212. As screw head 228 is turned, screw 218 may exert a force upon the inner jaw 214 and the outer jaw 212 in a direction along the longitudinal axis of screw 218, but in opposite directions. This may cause a movement of the inner jaw 214 and the outer jaw 212 in opposite directions. In essences, actuating screw 218 may cause the inner jaw 214 to move along threaded portion 230 and outer jaw 212 to move along threaded portion 232 in opposite directions due, in part, to the opposite thread directions of threaded portions 230 and 232.

In FIG. 17, double-threaded screw 218 has been turned to move the inner jaw 214 and outer jaw 212 to couple a shaft 234 that has been placed in opening 220 of the shaft adapter 210.

FIG. 18 is a top schematic view of the illustrative self-centering shaft adapter of FIG. 15 coupled to another illustrative shaft 236. In this illustrative view, a smaller shaft 236 is shown inserted into opening 220 of shaft adapter 210. In this case, shaft 236 has a relatively smaller diameter than shaft 234 of FIG. 17. However, in both illustrative views, opening 220 of the shaft adapter may have the same or similar center relative to housing 216, and in each view, the shaft 234 and 236 may be concentric or coaxial with opening 220.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A self-centering shaft adapter for securing a shaft to an actuator, wherein the shaft, extends along a shaft axis, comprising:
    a first jaw including an aperture having a first face;
    a second jaw disposed substantially within the aperture of the first jaw and having a second face, wherein the first face and the second face oppose each other and define an opening configured to receive the shaft with the shaft axis extending through the opening; and
    an actuation mechanism coupled to the first jaw and the second jaw, the actuation mechanism configured to exert a first force upon the first jaw and a second force on the second jaw such that the first jaw and the second jaw move in opposite relative directions;
    wherein at least one component of the actuation mechanism translates along a path generally parallel to the shaft axis but laterally offset from the shaft axis.

2. The self-centering shaft adapter of claim 1 wherein the at least one component of the actuation mechanism includes a wedge.

3. The self-centering shaft adapter of claim 2 further comprising a screw, wherein the wedge has a screw hole configured to receive the screw, and wherein the screw is configured to move the wedge.

4. The self-centering shaft adapter of claim 3, wherein the screw does not translate toward or away from a center of the opening when the actuation mechanism is actuated.

5. The self-centering shaft adapter of claim 1 wherein the first jaw and the second jaw move about the same distance in opposite directions.

6. The self-centering shaft adapter of claim 1, wherein the path along which the at least one component of the actuation mechanism translates is generally perpendicular to the movement of the first jaw and the second jaw.

* * * * *